UNITED STATES PATENT OFFICE.

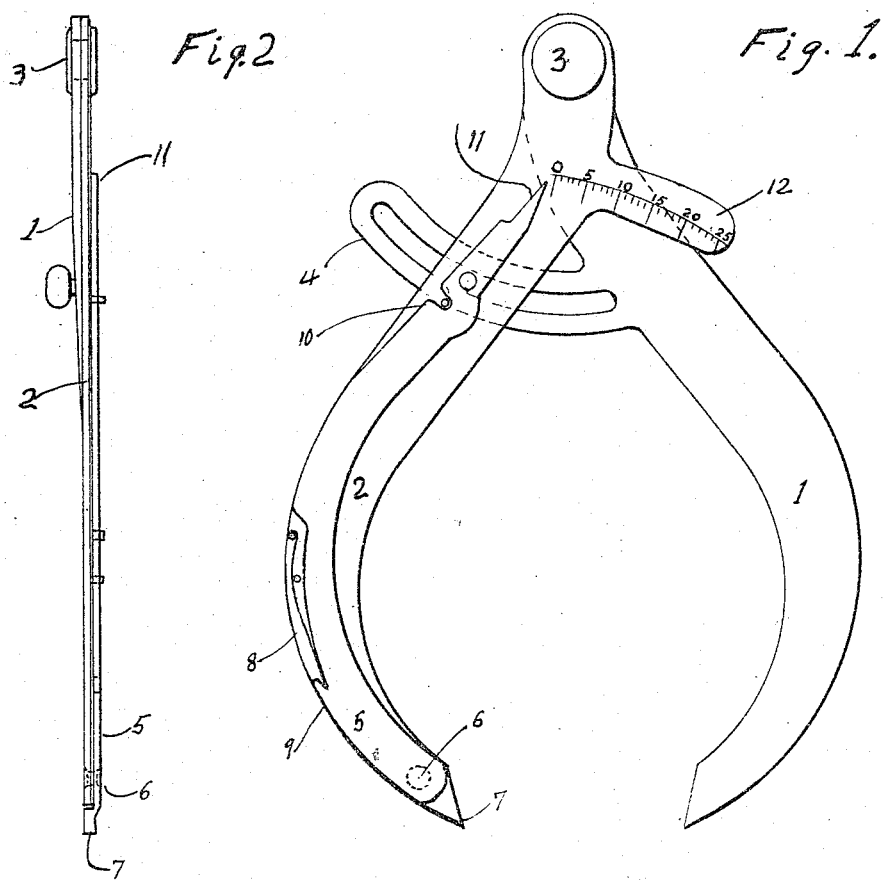

ERNEST KRAULE, OF SOUTH CLE ELUM, WASHINGTON.

CALIPERS.

1,245,148.  Specification of Letters Patent.  Patented Oct. 30, 1917.

Application filed September 5, 1916. Serial No. 118,354.

*To all whom it may concern:*

Be it known that I, ERNEST KRAULE, a citizen of the United States, and a resident of South Cle Elum, county of Kittitas, and State of Washington, have invented certain new and useful Improvements in Calipers, of which the following is a full, true, and exact specification.

My invention relates to calipers and more particularly to calipers having micrometer attachment, and has for its principal object to provide calipers having means for multiplying small differences in dimensions to such an extent that they may be easily read upon a scale; to provide a device of the class described having an amplifying differential scale which automatically shows the amount of over size above the setting of the calipers; that is to say which positively shows the exact distance which the measuring points of the device have to be extended in order to pass over the object to be measured.

Other objects will appear as my invention is more fully explained in the following specification, illustrated in the accompanying drawing and pointed out in the appended claim.

In the Drawings Figure 1 is a side elevation of my device. Fig. 2 is an edge elevation of same.

Referring more particularly to the drawings, numerals 1 and 2 indicate the right and left hand legs of a caliper. The legs 1 and 2 are hinged together as at 3 and are of a common shape. Leg 1 is pointed at its measuring end while the leg 2 is somewhat abbreviated. A clamping quadrant 4 is integral with leg 1 and extends past leg 2. The leg 2 is provided with a differential arm 5 which is pivoted near the lower end of said leg as at 6 and is provided with a point 7 which corresponds with the point of leg 1. The differential arm 5 is retained in normal position as shown by means of a leaf spring 8 which engages a notch 9 in said leg. A limit stop 10 is also provided for the differential arm 5. The upper end of the differential arm 5 terminates in an indicating point 11 which is adapted to move along the face of a scale extension 12 which is integral with leg 2. My device is operated as follows: The calipers are set as required either by means of a ruler or by means of a scale on clamping quadrant 4. The calipers are then placed upon a piece of work which it is desired to measure. The difference between the correct measurement upon which the calipers have been previously set, and the actual measurement will be indicated by the swinging of the differential arm 5 and may be read upon the scale 12. Thus it will be seen that the over-size is quickly indicated. My device may be used for much finer measurements and adjustments than the ordinary calipers.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

In a caliper, the combination of a pair of bowed legs pivoted at their upper ends, one of said legs being pointed at its lower end and provided near its upper end with an arcuate slotted extension which overlaps the other leg, the arc of the extension being struck from the axis of the pivot connecting the two legs, a pin extending from the leg which overlaps the arcuate extension, said pin engaging the slot in the extension, a supplemental leg pivoted near the lower end of the leg which overlaps the extension and is extended beyond the lower end of said overlapping leg and is pointed to coöperate with the pointed end of the first mentioned leg, the overlapping leg being provided with an arcuate extension above the arcuate slotted extension and provided with a scale located on an arc the center of which is the axis of the pivot of the supplemental leg, the upper end of the supplemental leg being pointed to coöperate with the arcuate scale, a leaf spring secured on the overlapping leg, said spring being seated in a recess formed in the edge of the supplemental leg, the lower edge of the spring being held in the recess, whereby to retain the supplemental leg in normal position, and a stop on the overlapping leg to engage a notch formed in the supplemental leg, whereby to limit the movement of the latter.

ERNEST KRAULE.